C. B. HUNTING.
Plow-Colter.
No. 57,909. Patented Sept. 11, 1866.
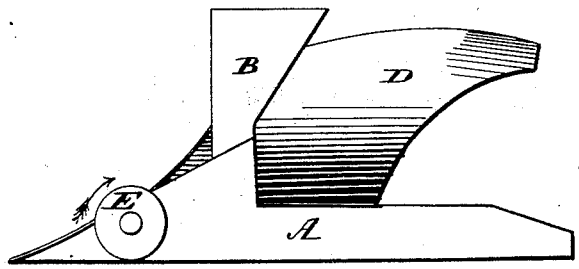
Witnesses
Inventor
C. B. Hunting
Per Munn & Co
Attorneys

UNITED STATES PATENT OFFICE.

CHESTER B. HUNTING, OF CLINTON, ILLINOIS.

IMPROVEMENT IN PLOWS.

Specification forming part of Letters Patent No. 57,909, dated September 11, 1866.

*To all whom it may concern:*

Be it known that I, CHESTER B. HUNTING, of Clinton, De Witt county, and State of Illinois, have invented a new and useful Improvement in Plows; and I do hereby declare that the following is a full, clear, and exact description thereof, which will enable others skilled in the art to make and use the same, reference being had to the accompanying drawing, forming part of this specification.

The nature of my invention consists in attaching a circular cutter to a common Seward plow in such a manner that it revolves and cuts from the bottom up, thus making it much easier in its operation and not adding to or impeding its draft, as is the case with the common colter or cutter that is attached to the beam of the plow.

To enable others skilled in the art to make and use my invention, I will proceed to describe its construction and operation.

The figure is a side elevation of my improved plow. The figure represents the bottom or iron portion of a plow to which my improved cutter is attached.

Letters of like name and kind refer to like parts in the figure.

A represents the land-side of an ordinary or common plow. B is the standard, made in the common manner, and D is the mold-board, which is also made in the common way. E is the cutter, made circular in form and from thin steel or other proper material, and attached to the land-side of a common plow by means of an axle or gudgeon, upon which it runs in the direction of the arrow, thus cutting from bottom to top.

It will be at once seen that the advantages in cutting from bottom to top are very great over the ordinary way of cutting from top to bottom or straight forward with an upright cutter, where the resistance comes at, or nearly at, right angles with the colter or cutter.

It will also be seen that as the plow proceeds through the ground and begins to rise upon the mold-board it comes in contact with the cutter and rides up the ascent and is cut by its own weight, by which means the plow is relieved of the friction produced by the common colter.

Having thus described my invention, what I claim as new, and desire to secure by Letters Patent, is—

A cutter made in the form of a disk and attached to a plow, so as to cut from bottom to top, for purposes and substantially as herein described.

CHESTER B. HUNTING.

Witnesses:
    JOSEPH J. KELLY,
    JAMES JORDAN.